Dec. 22, 1931.  M. A. HARRIS  1,837,773
COWL VENTILATOR AND WINDSHIELD HEATER
Filed March 3, 1930
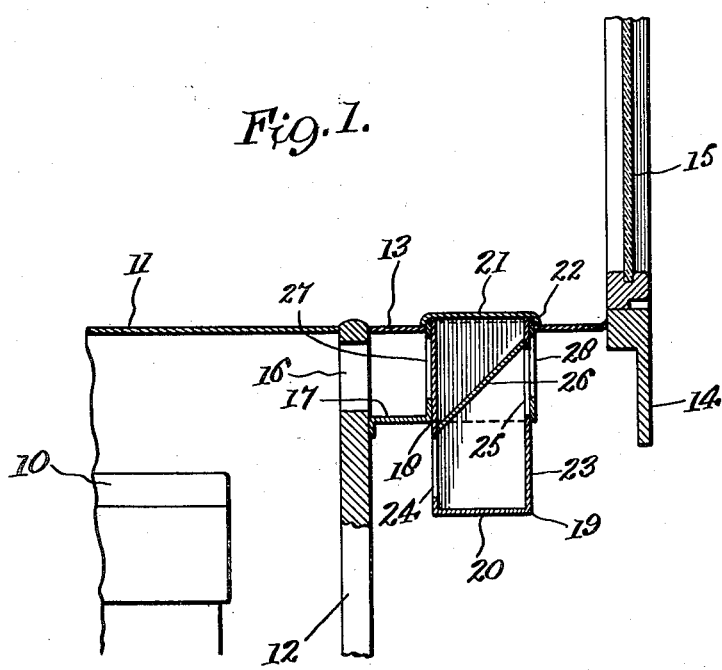
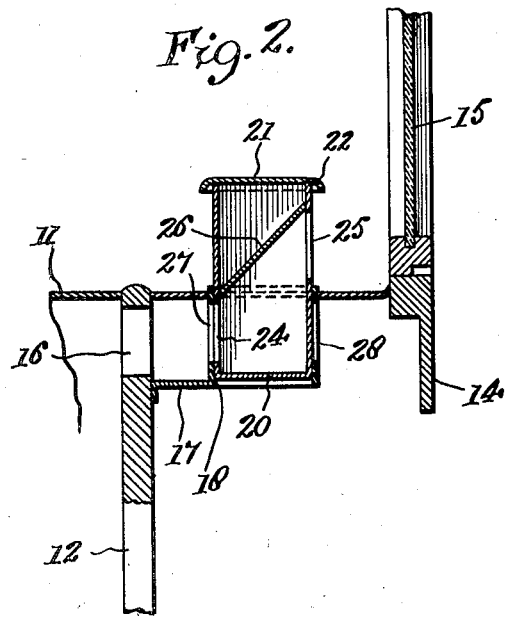
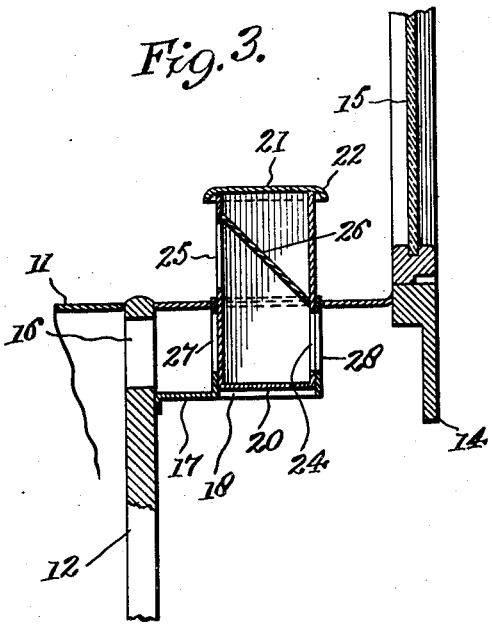
Inventor
M. A. Harris
By Wilkinson & Mawhinney
Attorneys.

Patented Dec. 22, 1931

1,837,773

UNITED STATES PATENT OFFICE

MOSES A. HARRIS, OF MILFORD, CONNECTICUT

COWL VENTILATOR AND WINDSHIELD HEATER

Application filed March 3, 1930. Serial No. 432,815.

The present invention relates to improvements in combined cowl ventilator and windshield heater and has for an object to provide for the entrance of air in the summer and hot weather to the interior space of the automobile embraced within the cowl and in and about the operating pedals, and in the winter and cold weather to provide for the directing of the heated air from within the hood to a point adjacent the windshield, whereby condensation, frost, snow, sleet and the like will be prevented from forming on the windshield.

Another object of the invention is to provide safety in the driving of vehicles in wintry weather by maintaining the windshield glass clear and vision therethrough uninterrupted.

A further object of the invention is to provide a simple and compact adjustable control device for accomplishing the above described purposes.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a fragmentary vertical sectional view taken through a vehicle and showing the portion of the windshield, engine, hood, dash and instrument boards, cowl, and the improved device in a closed position.

Figure 2 is a similar view with the device in position to act as a windshield heater, and Figure 3 is also a fragmentary vertical section showing the improved device arranged as a ventilator.

Referring more particularly to the drawings, 10 designates a portion of an internal combustion engine for driving a vehicle having the hood 11, dashboard 12, cowl 13, instrument board 14 and windshield 15.

In accordance with the present invention an opening 16 is made in the upper portion of the dashboard 12 and a tube 17 is mounted within the cowl 13 in axial alignment with the opening 16. This tube is provided with a vertical opening 18 therethrough which also extends through the cowl 13 whereby the improved control device 19 is mounted vertically through the cowl and tube 17. This control device is provided with a closed bottom 20 and a closed top 21 preferably having a downwardly curved marginal flange 22 to avoid the entrance of rain, snow, dust or foreign particles and to impart a finished appearance to the device.

The side wall of the device is indicated at 23 and this may be circular, square or of any desired shape and it is imperforate except for the forward lower port 24 and the rear upper port 25. A diagonal deflecting partition 26 is mounted within the hollow device and extends between the upper portions of the ports 24 and 25.

The operation of the device is as follows:—

Figure 1 shows the device closed and inoperative, to which position it may be moved at any desired time.

Figure 2 shows the device raised and in position to act as a windshield heater. In this instance the lower forward port 24 registers with the port 27 and the tube while the upper rear port 25 is exposed above the cowl 13. The rear port 28 of the tube 17 will be closed by the rear lower blank wall of the device. Consequently the heated air confined beneath the hood 11 will pass out through the opening 16 in the dashboard, through the tube 17, ports 27, 24 and 25 and against the windshield glass 15, thus heating it and preventing accumulations thereon.

Figure 3 shows the device in position for ventilation, with the device turned around one-half turn from the position of Figure 2. If the device is made square, it may be lifted out, rotated 180 degrees and reinserted so that the higher port 25 is forward and the lower port 24 rearward. In this case fresh air from the exterior atmosphere will enter the exposed upper port 25, will strike the deflector 26 and be diverted down to the registering ports 24 and 28.

In this way fresh air from the atmosphere is admitted to the confined space behind the dashboard 12 and within the cowl 13 in and about the feet of the occupants of the front seat of the vehicle. In this position the blank wall at the forward lower portion of the device closes the front port 27 and excludes engine heat.

It is obvious that various changes and modifications may be made in the details of construction and design of the above specifically described embodiment of this invention without departing from the spirit thereof, such changes and modifications being restricted only by the scope of the following claims:

What is claimed is:—

1. In an automobile having a hood and a windshield, of means constructed in one position to divert heat from beneath the hood to a point adjacent the windshield and in a subsequent position to divert air from the atmosphere into the body of the vehicle.

2. In a motor vehicle, a vertically movable and angularly adjustable device disposed between the hood and the windshield and having staggered ports for supplying heated air from the hood to a point adjacent the windshield in one position of the device and atmospheric air to the body of the vehicle in another position of the device.

3. In a vehicle having a hood, dashboard, cowl and windshield, a device mounted in the cowl and having upper and lower ports adapted in one vertical position of the device to register with the hood space and the space above the cowl adjacent the windshield and in another angularly horizontal position to register with the external atmosphere and the interior of the cowl.

4. In a vehicle having a hood, dashboard provided with a perforation in its upper portion, cowl and windshield, a tube extending within the cowl behind the dashboard port and being open from end to end, a hollow control device mounted for vertical movement in said cowl and tube and adapted to be rotated, said control device being hollow and having front and rear upper and lower ports with a diagonal deflector connecting the upper portions of said ports.

MOSES A. HARRIS.